United States Patent
Kuhman

(10) Patent No.: US 7,387,426 B2
(45) Date of Patent: Jun. 17, 2008

(54) EXTRUDER SCREW WITH MIXING SECTION

(75) Inventor: Jon L. Kuhman, Ann Arbor, MI (US)

(73) Assignee: Glycon Corporation, Tecumseh, MI (US)

( * ) Notice: Subject to any disclaimer, the term of this patent is extended or adjusted under 35 U.S.C. 154(b) by 226 days.

(21) Appl. No.: 11/266,930

(22) Filed: Nov. 4, 2005

(65) Prior Publication Data

US 2007/0104022 A1   May 10, 2007

(51) Int. Cl.
*B29C 47/64* (2006.01)
(52) U.S. Cl. .............................. 366/81; 366/88; 366/90
(58) Field of Classification Search .................. 366/89, 366/88, 90, 321, 322, 324; 425/204, 208, 425/209
See application file for complete search history.

(56) References Cited

U.S. PATENT DOCUMENTS

| | | | |
|---|---|---|---|
| 2,631,016 A * | 3/1953 | Kraffe de Laubarede | |
| 2,680,879 A * | 6/1954 | Schnuck et al. | ............... 366/90 |
| 3,006,029 A * | 10/1961 | Saxton | |
| 3,595,533 A * | 7/1971 | Sutter | |
| 3,652,064 A * | 3/1972 | Lehnen et al. | |
| 3,690,623 A * | 9/1972 | Boyne | |
| 3,884,451 A * | 5/1975 | Stenmark et al. | |
| 3,941,535 A * | 3/1976 | Street | |
| 4,199,263 A * | 4/1980 | Menges et al. | |
| 4,201,485 A * | 5/1980 | Walker | |
| 4,304,054 A * | 12/1981 | Nauck | |
| 4,779,989 A * | 10/1988 | Barr | ............... 366/90 |
| 5,044,759 A * | 9/1991 | Gagliani | |
| 5,071,256 A * | 12/1991 | Smith et al. | |
| 5,318,357 A * | 6/1994 | Colby et al. | |
| 5,342,125 A * | 8/1994 | Myers | |
| 5,816,698 A * | 10/1998 | Durina et al. | |
| 6,227,692 B1 * | 5/2001 | Heathe | |
| 6,488,399 B1 * | 12/2002 | Womer et al. | ............... 366/81 |
| 6,497,508 B1 * | 12/2002 | Womer et al. | |
| 6,547,431 B1 * | 4/2003 | Womer | |
| 6,599,004 B2 * | 7/2003 | Barr | |
| 7,036,974 B2 * | 5/2006 | Sassi et al. | ............... 366/81 |
| 2004/0141406 A1 * | 7/2004 | Womer et al. | |
| 2004/0179425 A1 * | 9/2004 | Sassi et al. | ............... 366/81 |
| 2004/0257904 A1 * | 12/2004 | Zhang | |
| 2007/0104022 A1 * | 5/2007 | Kuhman | ............... 366/81 |

* cited by examiner

*Primary Examiner*—Tony G Soohoo
(74) *Attorney, Agent, or Firm*—Fraser Clemens Martin & Miller LLC; William J. Clemens

(57) ABSTRACT

An extruder screw mixing section has a plurality of threads formed on a body of the screw with a pitch defining mixing channels for moving material in a direction from a feed end to a discharge end of the screw. The threads and the mixing channels are interrupted by counter channels that divide the mixing channels into segments of similar diminishing depth profile. A portion of the material moves through the counter channels in direction from the discharge end to the feed end to promote better mixing and melting of the material.

16 Claims, 4 Drawing Sheets

EXTRUDER SCREW WITH MIXING SECTION

BACKGROUND OF THE INVENTION

The present invention relates generally to extruder screws and, in particular to an extruder screw with a mixing section.

Extruder screws are used for transforming solid materials into a molten mixture for subsequent use in a mold or die via extrusion or injection. Materials that are used for this purpose include a range of plastic materials, as well as various metal or thixotropic materials. The screw consists of a generally cylindrical body with at least one helical thread machined thereon. The outer diameter of the threads is known as the peak of the screw, the areas between the peaks are known as channels of the screw. The opposing ends of the screw are known as the feed end, where the solid material is introduced, and the discharge end, where the molten material is delivered.

Extrusion, injection molding or blow molding with a single screw extruder, includes feeding the solid material in pellet, chip, powder, or flake form to the feed end of the extruder through a hopper or similar device mounted on an opening of a heated cylindrical barrel. The extruder screw is rotatably mounted and received in the barrel. The screw thread maintains a minimum clearance to the barrel and the material is moved downstream through the channel from the feed end to the discharge end by forces exerted by the rotation of the screw. The solid material fed into the screw channel is compacted into a solid plug or solid bed and the solid bed melts as it travels down the screw channel.

Extruder screws are often divided into a plurality of sections along the length of the screw from a feed section adjacent the feed end of the screw, where the solid material is introduced to the screw, to a metering section adjacent the discharge end of the screw, which delivers the molten material in a constant amount for extrusion or injection. Often, the feed section and the metering section each have a constant barrel clearance. The section or sections between the feed section and the metering section of the screws can include, but is not limited to, a taper section, an energy transfer section, and a mixing section. It is in these intermediate sections where the majority of the melting of the solid material into the molten material occurs.

Because the majority of the melting of the solid material occurs in the mixing section, it is desirable to maximize the amount of mixing and efficiency of the melting in the mixing section and thereby increase the overall efficiency of the extrusion, injection molding, or blow molding process. It is also desirable to provide an extruder screw mixing section that may be constructed with a minimal amount of machining.

SUMMARY OF THE INVENTION

The present invention concerns an extruder screw mixing section that includes an elongated extruder screw body having a circumferential surface and at least one primary thread formed thereon. The primary thread defines a plurality of peaks and a plurality of channels between the peaks and extends along the extruder screw body at a substantially constant pitch and in a first direction. The extruder screw body includes at least one mixing channel formed thereon and extends along the extruder screw body at a substantially constant pitch and in a second direction opposite the first direction. The mixing channel interrupts the peaks and the channels of the primary thread and extends below a nominal surface of the primary thread channels for substantially one full turn about the circumferential surface of the extruder screw body.

The extruder screw mixing section in accordance with the present invention advantageously provides an efficient mixing section that may be constructed with a minimal amount of machining.

DESCRIPTION OF THE DRAWINGS

The above, as well as other advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
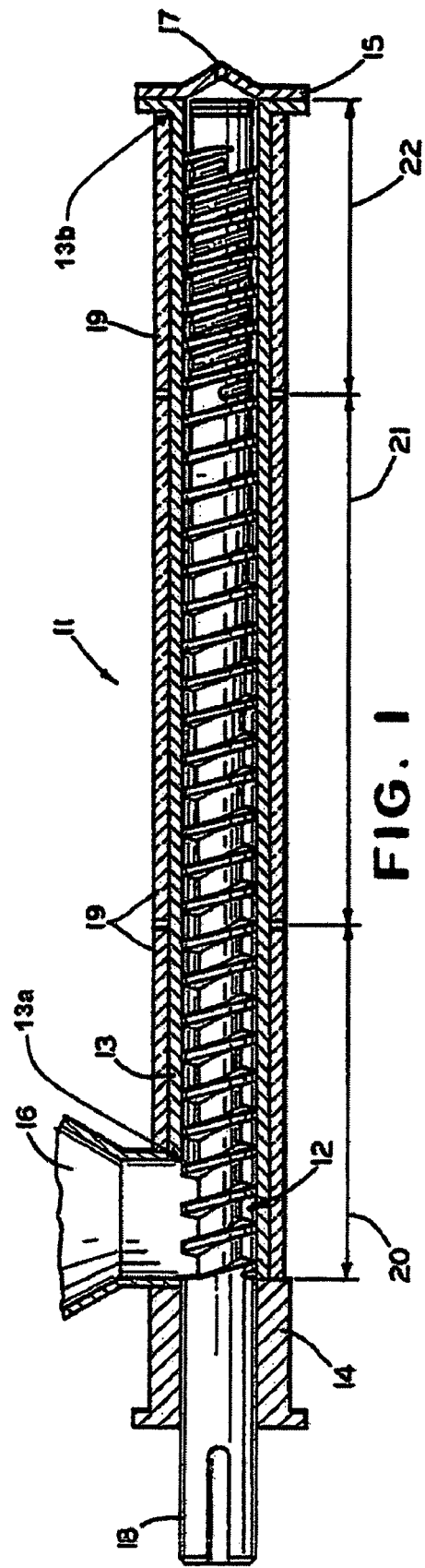
FIG. 1 is a cross-sectional front elevation view of a prior art extruder screw showing the various sections of the screw in accordance with the prior art.

There is shown in the FIG. 1, a typical plastics extruding apparatus 11 in accordance with the prior art. The apparatus 11 includes a feedscrew 12 rotatably mounted and received in a generally tubular elongated barrel 13 having an inlet or feed end 13a and an outlet or discharge end 13b. The barrel 13 is closed at the feed end 13a by a feed end closure 14 and is closed at the discharge end 13b by a discharge end closure 15. A radially extending feed funnel 16 is attached to the barrel 13 at the inlet end for feeding solid plastic molding material to the interior of the barrel 13. A discharge orifice 17 is formed in the discharge end closure 15 for discharging molten plastic material into, for example, a mold or die (not shown). A drive extension 18 is attached to the feed end 13a of the feedscrew 12 and extends through the feed end closure 14 for coupling to a rotary drive means (not shown). Surrounding the exterior of the barrel 13 is a plurality of conventional heating means 19 for maintaining the temperature of the molten material. Alternatively, no heating means 19 is provided.

The feedscrew 12 is divided into a feed section 20, a transition section 21 and a metering section 22. In operation, solid material (not shown) is supplied to the feed funnel 16 in the form of granules, pellets, flakes, powder, or any other suitable form. The rotation of the feedscrew 12 conveys the solid material through the sections 20, 21, and 22 wherein the solid material is melted by heat supplied by the heating means 19 and the frictional heat developed by the shearing and mixing of the solid material between the rotating feedscrew 12 and the interior wall of the barrel 13. The molten material is then conveyed through the metering section 22 and is discharged through the discharge orifice 17 which may be in the form of a die for forming an extrudate into whatever shape is desired.

Figure 2:
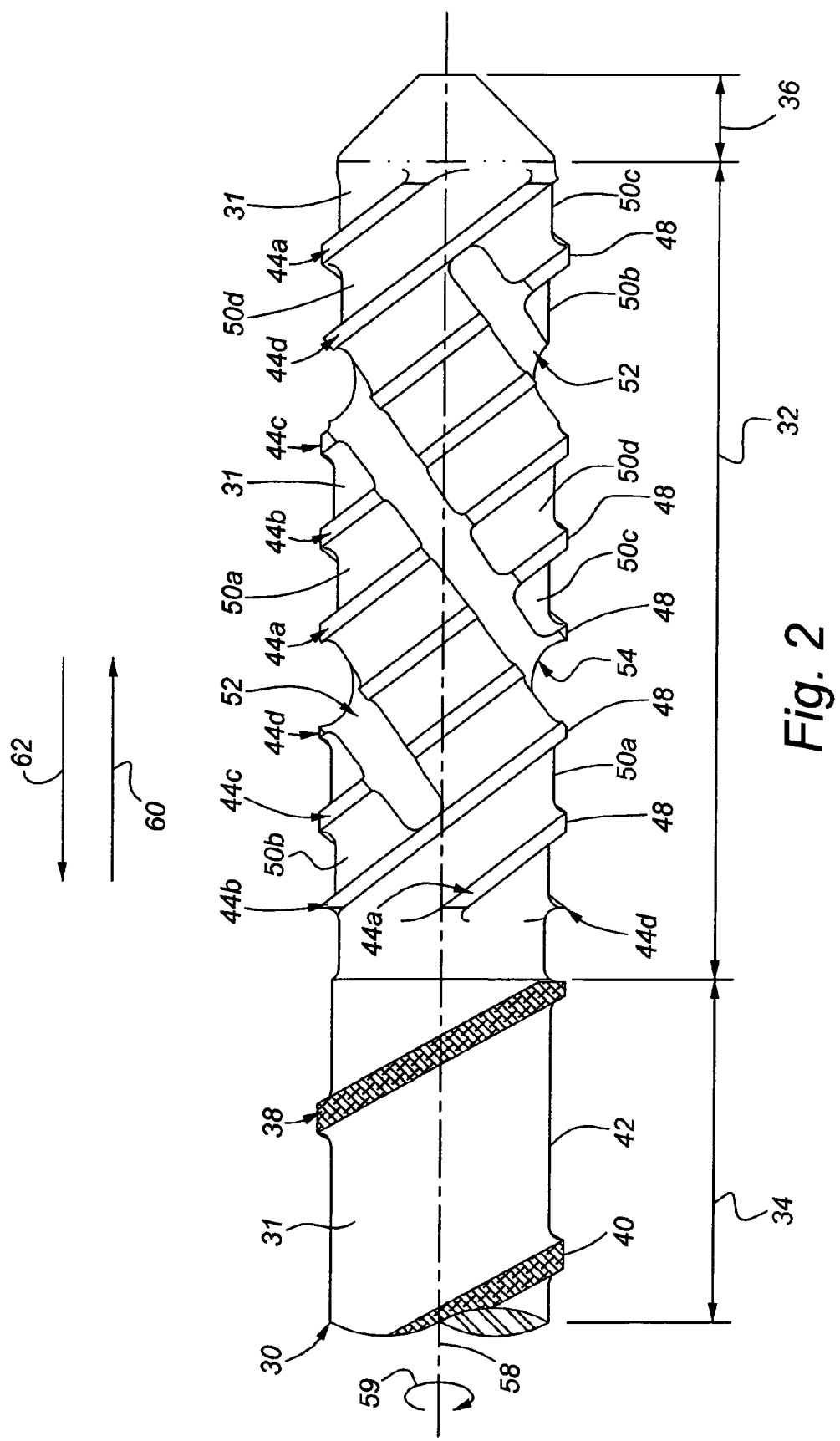
FIG. 2 is a fragmentary elevation view of an extruder screw mixing section in accordance with the present invention.
Figure 3:
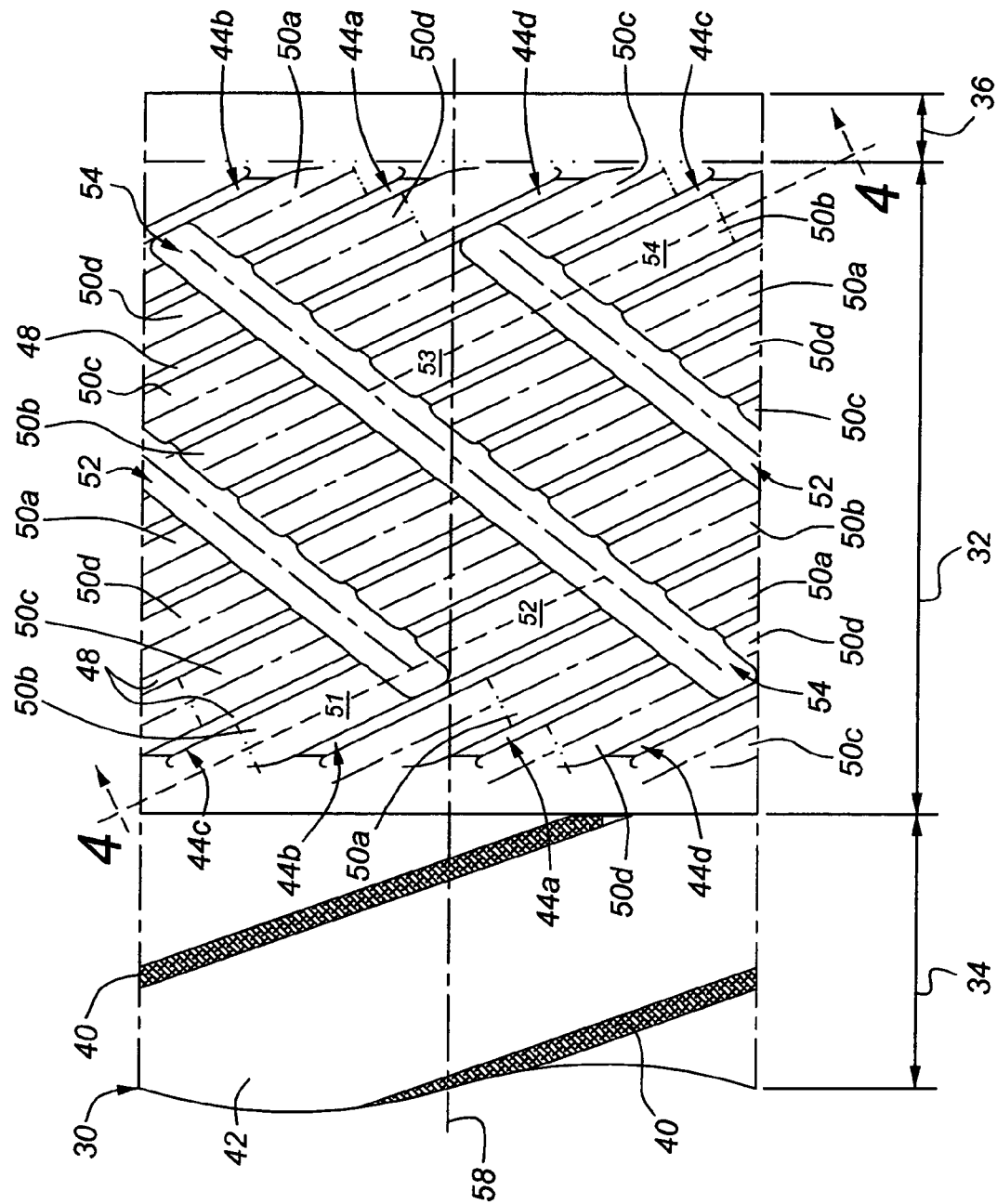
FIG. 3 is a plan view of the surface of the extruder screw shown in FIG. 2 as if unwrapped.
Figure 4:
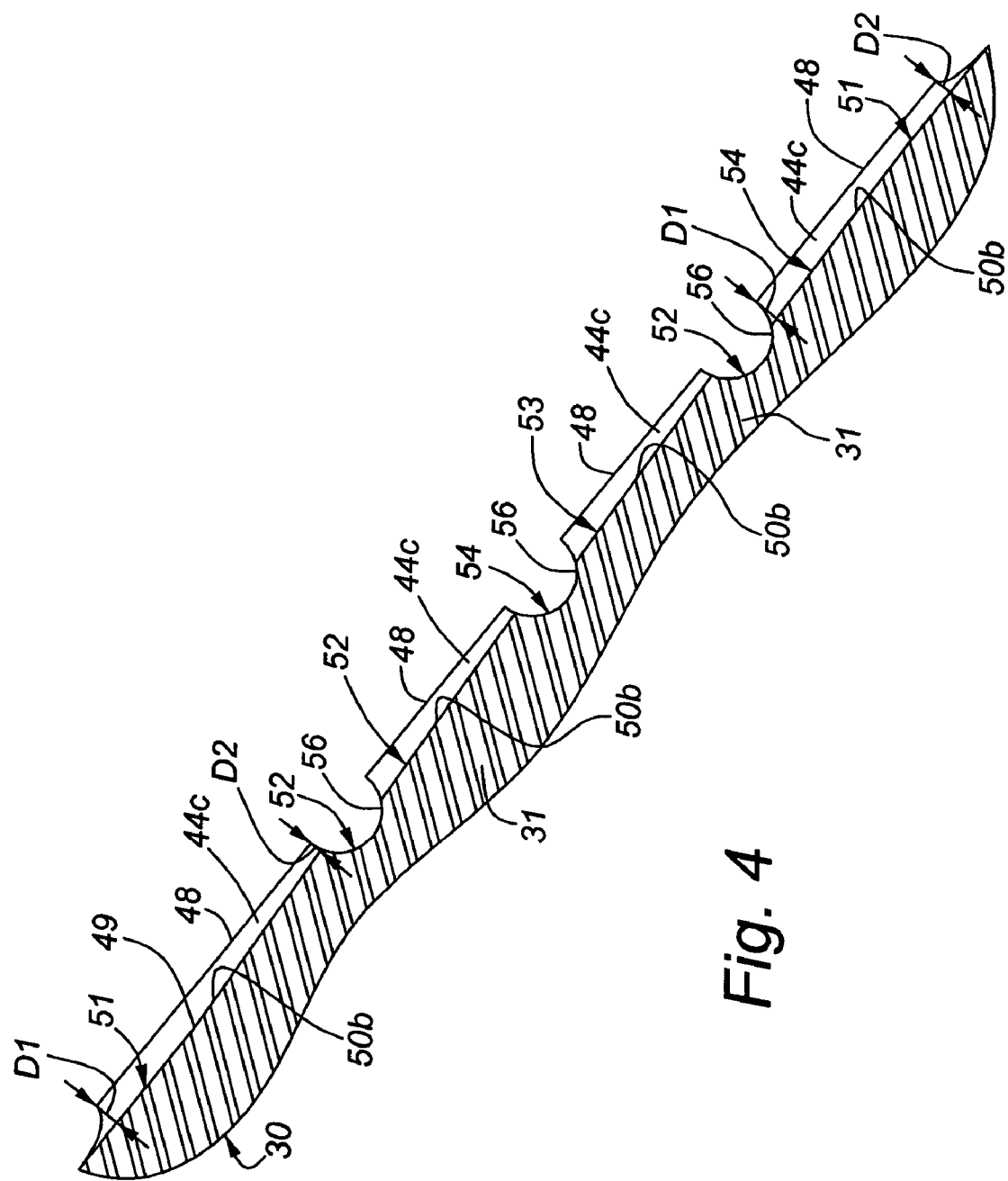
FIG. 4 is a cross-sectional view taken along the line 4-4 in FIG. 3.

Referring now to FIGS. 2-4, an extruder screw in accordance with the present invention is indicated generally at 30. The extruder screw 30 is adapted to be rotatably mounted and received in a barrel (not shown), such as the barrel 13 shown in FIG. 1. The extruder screw 30 includes an elongated body 31 having a substantially circular cross section and is divided into a mixing section 32 and a feed section 34. The feed section 34 extends from a feed end of the screw 30 and the mixing section 32 extends to a discharge end 36 of the screw 30. The feed section 34 is shown in fragmentary view and is similar to the feed section 20 shown in FIG. 1. The metering section 22 shown in FIG. 1 is typically provided on a feedscrew for injection molding and is not used on a feedscrew for an extrusion process. The feed section 34 includes a primary flight 38 extending about the circumference of the body 31 and at a substantially constant pitch along the length of the feed section 34. The primary flight 38 defines a land or a peak 40 at a radially outward surface of the flight 38 and a channel 42 on a radially outward surface of the body 31 between the peaks 40, best seen in FIG. 2. The discharge end 36 is tapered to a flat transverse to a longitudinal axis 58 of the screw 30.

The mixing section 32 includes a plurality of flights 44a through 44d extending about the circumference of the body 31 and at a substantially constant pitch along the length of the mixing section 32 and in the same direction as the primary flight 40 of the feed section 34. A first or feed end of each of the flights 44a through 44d is spaced a short distance from the beginning of the mixing section 32 and the first ends are spaced circumferentially 90° apart. Each of the flights 44a through 44d defines a land or a peak 48 on a radially outward surface and a plurality of mixing channels 50a through 50d are formed between adjacent ones of the flights.

The mixing section 32 also includes a first counter channel 52 and a second counter channel 54 extending about the circumferential surface of the body 31 and at a substantially constant pitch along the length of the mixing section 32 and in a direction opposite that of the flights 44a through 44d. The counter channels 52 and 54 are disposed on opposed sides, such as, but not limited to, substantially 180° apart, of the circumferential surface of the body 31 and each of the counter channels 52 and 54 extends, preferably uninterrupted, for substantially one full turn, or 360 degrees, along the circumferential surface of the body 31, best seen in FIG. 3. The counter channel 52 has one end in the mixing channel 50b adjacent the feed section 34 and an opposite end in the mixing channel 50c adjacent the discharge end 36. The counter channel 54 has one end in the mixing channel 50d adjacent the feed section 34 and an opposite end in the mixing channel 50a adjacent the discharge end 36. Each of the counter channels 52 and 54 is open to each of the mixing channels 50a through 50d at least twice along the mixing section 32.

The counter channels 52 and 54 divide the mixing channels 50a through 50d into a plurality of segments each sloped upwardly from the ends closest to the feed section 34 to the ends closest to the discharge end 36. In the example shown in FIG. 3, each of the mixing channels is intersected five times to define six segments. As shown in FIG. 4, the channel 50b and the adjacent flight 44c are intersected twice by the counter channel 52 and once by the counter channel 54 on the line 4-4. Along their respective lengths, the mixing channels 52 and 54 have semi-circular walls 56 in cross section, best seen in FIG. 4, and extend below the bottoms of the channels 50a through 50d. Thus, the portion of the mixing channel 50b shown in FIG. 4 has four segments S1 through S4 of the six total segments. The segment S1 begins at the feed end with a first depth D1 below the peak 48 and continues at that depth to a first point 49. At the point 49, the segment S1 slopes upwardly to a second depth D2, less than the depth D1, at the counter channel 52. The segment S2 extends from the counter channel 52 to the counter channel 54 with the same profile as the segment S1 between the point 49 and the counter channel 52. The segment S3 has the same profile as the segment S2. The segment S4 has the same profile as the segments S2 and S3 from the counter channel 52 to a second point 51. From the point 51 to the discharge end, the segment S4 has a constant depth D2. Therefore, the mixing channel 50b, as well as the other mixing channels 50a, 50c and 50d discharge a portion of the material into the counter channels 52 and 54 and the counter channels return that portion of the material to the start of the mixing section 32 to prompt more and better mixing before the material reaches the discharge end 36.

In operation, solid material is fed to the feed section 34 of the extruder screw 30, such as through the hopper 16 shown in FIG. 1 or the like. As the rotary drive means rotates the extruder screw 30 about the longitudinal axis 58 of the extruder screw 30, indicated by an arrow 59, the solid material is trapped in the channels 42 between the peaks 40 and is forced in a first direction, indicated by an arrow 60 in FIG. 2, from the feed section 34 towards the discharge end 36. As the screw 30 rotates, solid material moves from the channels 42 of the feed section 34 to the mixing channels 50a through 50d of the mixing section 32. The solid material in the mixing section 32 begins to be melted by the frictional heat developed by the shearing and mixing of the solid material between the rotating feedscrew 30 and the interior wall of the barrel. Heating means (not shown), such as the heating means 19 shown in FIG. 1 or similar means, may also be provided to promote greater melting within the mixing section 32. Larger, unmelted particles of the solid material are forced up the sloped surfaces of the mixing channel segments S1 through S4 and into the counter channels 52 and 54. In the counter channels 52 and 54, the larger particles move in a direction, indicated by an arrow 62 in FIG. 2, opposite the direction 60 towards the feed section 34 and away from the discharge end 36, advantageously allowing the larger particles a greater length of time to melt. As the larger particles travel in the counter channels 52 and 54 they are melted further and are eventually forced back into the mixing channels 50a through 50d by the rotation of the extruder screw 30 and the material flowing in the direction 60.

The length of the mixing section 32 may be advantageously varied while remaining within the scope of the present invention. The numbers of mixing channels and counter channels also can be varied. Thus, the mixing channels can be divided into any number of segments of diminishing depth.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An extruder screw having a mixing section comprising:
   an elongated extruder screw body extending between a feeder end and a discharge end, said body having a circumferential surface and a mixing section;
   at least one flight formed on said surface in said mixing section with a first predetermined pitch, said at least one flight forming a mixing channel for conveying material received from said feeder end toward said discharge end in a first direction; and
   at least one counter channel formed in said surface in said mixing section with a second predetermined pitch in a direction opposite said mixing channel, said at least one counter channel interrupting said at least one flight and said mixing channel to divide said mixing channel into at least two segments, each said segment having a profile of diminishing depth and sloping from an end closest to said feeder end to the opposing end closest to said discharge end.

2. The extruder screw according to claim 1 wherein said profiles of said segments are substantially identical.

3. The extruder screw according to claim 1 wherein said at least one counter channel extends below said surface.

4. The extruder screw according to claim 1 wherein said at least one counter channel is generally semi-circular in cross section.

5. The extruder screw according to claim 1 wherein said at least one counter channel extends at least 360° about said body.

6. The extruder screw according to claim 1 wherein said mixing section is disposed between a feed section and said discharge end of said body.

7. An extruder screw having a mixing section comprising:
  an elongated extruder screw body extending between a feeder end and a discharge end, said body having a circumferential surface with a mixing section;
  four flights formed on said surface in said mixing section with a first predetermined pitch, said flights forming four mixing channels for conveying material received from said feeder end toward said discharge end in a first direction; and
  at least one counter channel formed in said surface in said mixing section with a second predetermined pitch in a direction opposite said mixing channels, said at least one counter channel interrupting said flights and said mixing channels to divide each of said mixing channels into at least two segments, each said segment having a profile of diminishing depth and sloping from an end closest to said feeder end to the opposing end closest to said discharge end.

8. The extruder screw according to claim 7 wherein said profiles of said segments are substantially identical.

9. The extruder screw according to claim 7 wherein said at least one counter channel extends below said surface.

10. The extruder screw according to claim 7 wherein said at least one counter channel is generally semi-circular in cross section.

11. The extruder screw according to claim 7 wherein said at least one counter channel extends at least 360° about said body.

12. The extruder screw according to claim 7 wherein said mixing section is disposed between a feed section and said discharge end of said body.

13. An extruder screw having a mixing section comprising:
  an elongated extruder screw body extending between a feeder end and a discharge end, said body having a circumferential surface with a mixing section;
  four flights formed on said surface in said mixing section with a first predetermined pitch, said flights forming four mixing channels for conveying material received from said feeder end toward said discharge end in a first direction; and
  two counter channels formed in said surface in said mixing section with a second predetermined pitch in a direction opposite said mixing channels, said counter channels interrupting said flights and said mixing channels to divide each of said mixing channels into a plurality of segments, each said segment having a profile of diminishing depth and sloping from an end closest to said feeder end to the opposing end closest to said discharge end.

14. The extruder screw according to claim 13 wherein said counter channels each extend at least 360° about said body.

15. The extruder screw according, to claim 13 wherein said mixing channels are each divided into six segments by said counter channels.

16. The extruder screw according to claim 13 wherein said profiles of said segments are the same.

* * * * *